(12) United States Patent
Hackel et al.

(10) Patent No.: US 12,007,204 B2
(45) Date of Patent: Jun. 11, 2024

(54) METHOD FOR GUIDING A MISSILE, MISSILE CONTROLLER AND MISSILE

(71) Applicant: Diehl Defence GmbH & Co. KG, Ueberlingen (DE)

(72) Inventors: Martin Hackel, Ueberlingen (DE); Volker Koch, Rueckersdorf (DE); Michael Ganser, Ueberlingen (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 640 days.

(21) Appl. No.: 17/176,235

(22) Filed: Feb. 16, 2021

(65) Prior Publication Data

US 2021/0262762 A1 Aug. 26, 2021

(30) Foreign Application Priority Data

Feb. 21, 2020 (DE) .......................... 102020001157.8

(51) Int. Cl.
*F41G 7/22* (2006.01)
*G06T 7/20* (2017.01)
(Continued)

(52) U.S. Cl.
CPC ................ *F41G 7/226* (2013.01); *G06T 7/20* (2013.01); *G06T 7/70* (2017.01);
(Continued)

(58) Field of Classification Search
None
See application file for complete search history.

(56) References Cited

U.S. PATENT DOCUMENTS 3,025,023 A * 3/1962 Barghausen ............ G01S 3/783
244/175
3,614,778 A * 10/1971 Graham .............. G01S 13/9027
342/25 A
(Continued)

FOREIGN PATENT DOCUMENTS

CN 108919220 A * 11/2018 ................ G01S 7/41
DE 3145374 A1 6/1983
(Continued)

OTHER PUBLICATIONS

Paul Zarchan, Tactical and Strategic Missile Guidance, ISBN-10: 1-56347-874-9, 5th Edition, 2007, "Proportional Navigation and Miss Distance", Chapter 6, p. 95-118.

*Primary Examiner* — Bernarr E Gregory
(74) *Attorney, Agent, or Firm* — Laurence A. Greenberg; Werner H. Stemer; Ralph E. Locher

(57) ABSTRACT

A missile controller guides a missile along a flight path to a stationary or moving target object. The missile controller has at least one side-looking sensor, configured to record surroundings data and has a field of view aligned transverse to the longitudinal axis of the missile, and a control unit having a reception unit for receiving target object data regarding the target object. The target object data containing position data, orientation data and/or speed data of the target object. The control unit is configured to set the orientation of the missile during the guidance at least partly based on the received target object data such that the target object is located in the field of view of the side-looking sensor at least in sections of a final guidance phase.

17 Claims, 10 Drawing Sheets

(51) Int. Cl.
*G06T 7/70* (2017.01)
*F41G 7/00* (2006.01)

(52) U.S. Cl.
CPC ............... *G06T 2207/10048* (2013.01); *G06T 2207/30212* (2013.01); *G06T 2207/30241* (2013.01)

(56) References Cited

U.S. PATENT DOCUMENTS

| | | | | |
|---|---|---|---|---|
| 3,778,007 | A * | 12/1973 | Kearney, II | F41G 7/226 |
| | | | | 244/3.14 |
| 5,473,331 | A | 12/1995 | Kennedy et al. | |
| 5,647,560 | A | 7/1997 | Schnatz et al. | |
| 6,911,933 | B1 * | 6/2005 | Mutz | G01S 13/9029 |
| | | | | 342/190 |
| 6,965,342 | B2 | 11/2005 | Klausing et al. | |
| 7,494,089 | B2 * | 2/2009 | Williams | F41G 7/2253 |
| | | | | 244/3.17 |
| 8,084,724 | B1 * | 12/2011 | Brosch | F41G 7/2253 |
| | | | | 244/3.17 |
| 9,719,924 | B1 | 8/2017 | Stratis et al. | |
| 2009/0001214 | A1 * | 1/2009 | Williams | F41G 7/308 |
| | | | | 244/3.1 |
| 2012/0200449 | A1 * | 8/2012 | Bielas | F41G 7/306 |
| | | | | 342/372 |
| 2016/0084623 | A1 * | 3/2016 | Facciano | F41G 7/2293 |
| | | | | 342/372 |

FOREIGN PATENT DOCUMENTS

| | | | | |
|---|---|---|---|---|
| DE | 4442134 | A1 | 5/1996 | |
| DE | 69515790 | T2 | 11/2000 | |
| EP | 0586302 | A1 * | 3/1994 | ......... G01C 21/1652 |
| EP | 3221921 | A1 | 9/2017 | |
| WO | 02088770 | A2 | 11/2002 | |
| WO | 2016081058 | A1 | 5/2016 | |

* cited by examiner

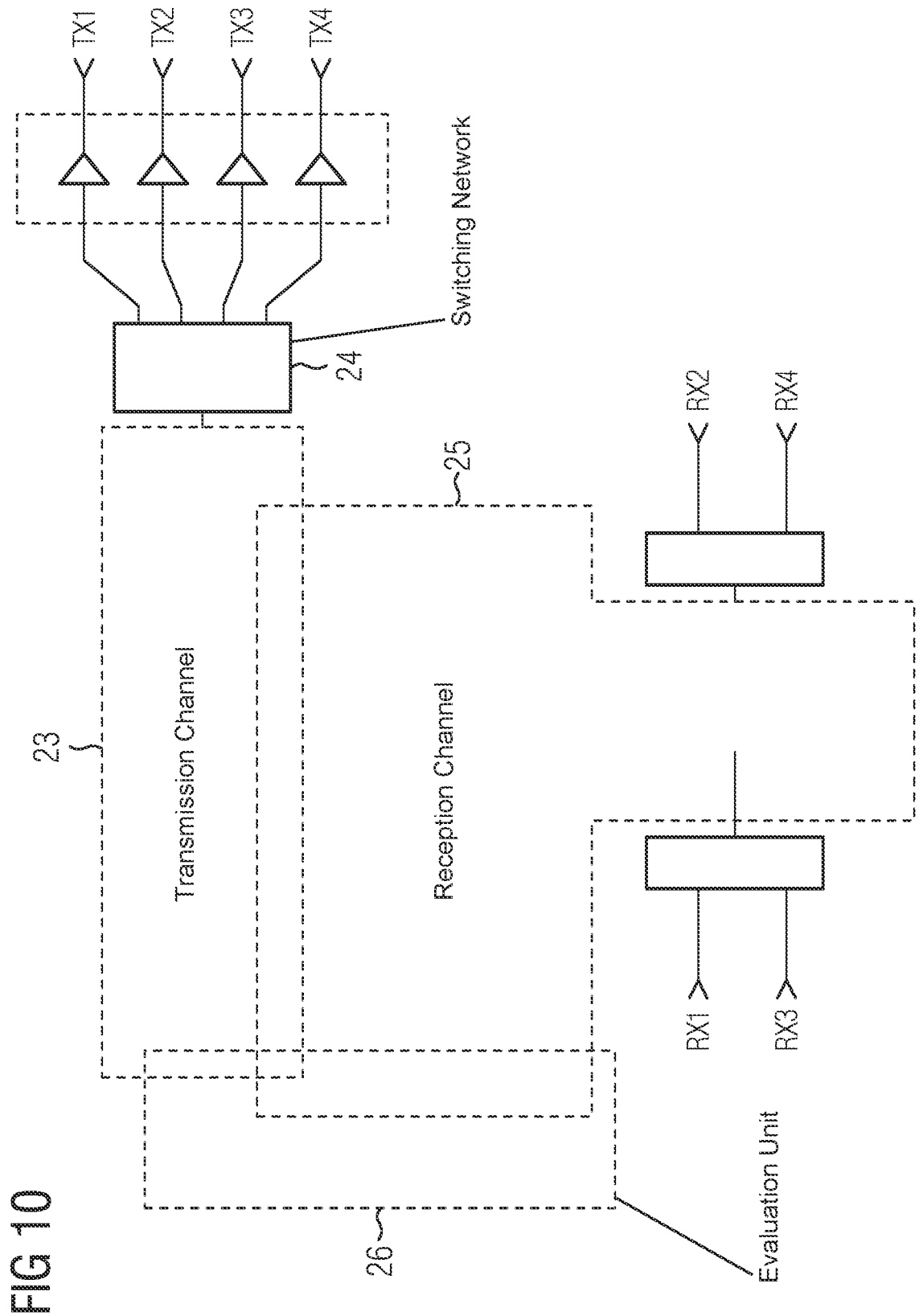

METHOD FOR GUIDING A MISSILE, MISSILE CONTROLLER AND MISSILE

CROSS-REFERENCE TO RELATED APPLICATION

This application claims the priority, under 35 U.S.C. § 119, of German patent application DE 10 2020 001 157.8, filed Feb. 21, 2020; the prior application is herewith incorporated by reference in its entirety.

BACKGROUND OF THE INVENTION

Field of the Invention

The underlying invention relates to a method for guiding a missile, to a missile controller and to a missile.

The prior art discloses for example weapons guidance systems that use a synthetic aperture radar to guide a weapon to a target. Such a weapons guidance system is known for example from DE 695 15 790 T2 (corresponding to U.S. Pat. No. 5,473,331), in which a firing platform is equipped with a synthetic aperture radar apparatus. Using the radar apparatus of the firing platform, it is possible to map the region surrounding a target, and the location of the target may be determined from the mapping. The weapon is flown to the target based on the location of the target as determined by the radar apparatus of the firing platform.

Published, non-prosecuted German patent application DE 31 45 374 A1 discloses a method by way of which it is possible to combat ground targets using a missile. The missile has a middle and an end phase seeker, wherein multiple targets are coordinated in the middle phase using a radar seeker and an approach course for the end phase is determined through target selection. The radar seeker operates in accordance with the synthetic aperture principle, wherein surfaces are sampled transverse to the flight direction in the middle phase and individual points of the sampled surface are resolved based on the Doppler history.

International patent disclosure WO 02/088770 A2, corresponding to U.S. Pat. No. 6,965,342, discloses a method for recognizing and identifying objects in the case of missiles. In the method, the surroundings of the missile are sampled by way of a radar device operating in accordance with the synthetic aperture principle, wherein the radar device contains a multiplicity of antenna elements that are installed along the curved missile contour of the missile tip.

Although the known methods allow target control in the case of a missile, it is still desirable to improve the accuracy of target navigation and guidance.

BRIEF SUMMARY OF THE INVENTION

On this basis, one object of the invention is to provide a method for guiding a missile, a missile controller for guiding a missile and a missile having a missile controller, all of which allow improved guidance. It may also be considered to be an object of the invention to provide a missile controller for guiding a missile, a method for guiding a missile and a missile, all of which offer advantages in terms of functionalizing the missile.

This object is achieved by the features of the independent claims. Refinements of the invention become apparent from the dependent claims and from the following description of refinements and exemplary embodiments.

According to one refinement, what is provided is a missile controller for the guidance, for example for target navigation, of a missile along a flight path to a target object. The target object may be a stationary or moving target object.

The missile controller is configured in particular to be functionally mounted or integrated on or in a missile, for example on or in a missile body. In this connection, functional or functionally should be understood to mean in particular that the general flight properties of the missile, in particular in terms of aerodynamics when the missile controller and associated sensors are mounted or integrated, are not, at least not substantially, impaired. By way of example, the missile controller, in particular associated sensors, may be configured to be integrated on or in a missile body of the missile between the missile tip and the drive unit of the missile. To this end, the missile controller may for example comprise a missile body segment, be mounted on or in same or be integrated on or in same. The missile body segment may for example comprise corresponding mounting interfaces or integration interfaces that allow mounting or integration between the missile tip and the drive-side end of the missile.

The missile may be for example a guided missile that is able to be fired from a launch unit. Such a missile, viewed in the longitudinal direction of the missile, may in particular comprise a missile head at a head-side end located in the longitudinal direction and a missile drive at a drive-side end facing away therefrom.

The launch unit may in this case be ground-based, airborne and/or waterborne.

The missile controller contains at least one side-looking sensor, configured to record surroundings data, having a field of view aligned transverse to the longitudinal axis of the missile.

A side-looking sensor should in this case in particular be understood to mean a sensor unit that has one or more sensors that is/are located, in particular positioned, between the missile head located at the head-side end and the missile drive located at the drive-side end. Such a side-looking sensor should furthermore be understood to mean a sensor unit whose one or more sensors each have a field of view whose middle axis or center axis, with respect to the longitudinal axis of the missile as polar axis, in the mounted state, always has/have a polar angle other than zero, in particular an acute polar angle. Such a side-looking sensor may for example be installed on a side wall of the missile or integrated in a side wall of the missile.

The polar angle should in this case be understood with respect to a polar axis defined by the longitudinal axis of the missile in the sense of spherical coordinates, more precisely with respect to a polar axis running parallel to the longitudinal axis direction of the missile and the middle axis or center axis of the sensor array. The polar angle should in this case be understood to mean that angle that is measured between the polar axis vector pointing from the drive-side end to the head-side end along the polar axis and the middle axis or center axis vector running along the respective middle axis or center axis and pointing away from the missile in the direction of the field of view.

A corresponding side-looking sensor, in the mounted state, with respect to the polar angle, accordingly always has a field of view that is not concentric with respect to the missile axis. To avoid a lack of clarity, the direction of the positive polar axis, that is to say the polar axis vector, should be understood with respect to a right-hand reference system of the missile in spherical coordinates, wherein the direction of the positive polar axis is defined by the direction running from the drive-side end to the head-side end. The polar angle should be understood in the above sense in accordance with this spherical coordinate system. An associated azimuthal angle should be understood as an angle measured right-handed in the circumferential direction with respect to the polar axis vector.

The above explanations with respect to the alignment of the field of view with regard to spherical coordinates are intended to apply accordingly to other coordinate systems different from spherical coordinate systems, in particular to coordinate systems that are not associated fixedly with the missile.

The term field of view should in this case be understood generally and not be restricted to optical sensors, but rather apply accordingly to any sensors, for example to infrared sensors, radar sensors and other types of sensor that are suitable for being able to detect a target object when implemented as a side-looking sensor.

The missile controller furthermore contains a control unit having a reception unit for receiving target object data relating to the target object. The target object data may comprise position data, orientation and/or speed of the target object.

Data regarding the position, orientation and/or speed of the missile may be determined in a known manner, for example from inertial navigation.

The reception unit may receive the target object data from a transmission unit external to the missile. If necessary, data regarding the missile may also be received from the transmission unit external to the missile, for example in the form of position data as a starting point for inertial navigation.

The transmission unit may for example be part of a supervision unit associated with the missile. The supervision unit may be for example a ground-based, airborne or waterborne supervision unit for the missile, which may be for example part of a launch unit or of a launch or firing platform for the missile. The transmission unit of the supervision unit may transmit the target object data, and other data regarding the missile, to the missile, for example in a wired manner, before the missile is launched or fired. It is also possible for the supervision unit to transmit the target object data and other data wirelessly to the reception unit, in particular after the missile is launched or fired.

Transmission or reception of target object data should in particular also be understood to mean or encompass that target object data transmitted or received in a previous data transmission step are updated, that is to say that the target object data are updated.

The control unit is configured such that the orientation of the missile, in particular the yaw, pitch and/or roll angle of the missile, are able to be set during the guidance at least partly based on the received target object data such that the target object is located in the field of view of the side-looking sensor at least in sections of a final guidance phase, in particular an interception phase.

Since the control unit is configured to perform or execute the respective functions described herein, it may be programmed accordingly. The programming may in this case be in the form of fixed programming on a corresponding control chip and/or be provided in the form of instructions that, when executed by a computer unit, in particular a processor, of the control unit bring about execution of the respective functions described herein.

The missile having the proposed missile controller may in particular be controlled by setting the orientation of the missile, in particular by setting or controlling the alignment of the missile and thus of the side-looking sensor, based on the target object data as prior knowledge, such that a target object targeted when the missile is fired or launched but not yet located in the field of view of the side-looking sensor at launch moves into the detection region of the field of view of the side-looking sensor after the missile is launched, such that the target object is able to be detected and tracked by the side-looking sensor. After the target object has been detected by the side-looking sensor, in particular after the target object has been detected by the side-looking sensor for the first time, the missile may be controlled, in particular navigated, based on the sensor data recorded by the side-looking sensor. By way of example, information, specifically data regarding the position, orientation and/or speed of the target object, may be determined from the sensor data. Based on the determined information, the missile controller is able to navigate the missile to the target object.

The missile may in this case in particular be controlled and the flight path and orientation, for example the roll angle, of the missile may be controlled such that the target object remains detectable by the side-looking sensor, that is to say continues to be located in the field of view of the side-looking sensor, on the one hand, and it is possible to reach a determined, provisional meeting location of the missile with the target object, on the other hand. The orientation is intended in this case to comprise in particular the status and alignment of the missile in three-dimensional space, these usually being described in the case of missiles on the basis of the yaw angle, the pitch angle and the roll angle, these angles describing rotations that convert a fixed reference system into a missile-related right-hand coordinate system. Yaw angle, pitch angle and roll angle in this respect describe corresponding statuses and alignments of the missile, that is to say accordingly yaw status, pitch status and roll status of the missile.

For appropriate flight control, it is possible to use for example information regarding the position, orientation and/or speed of the target object as obtained from the sensor data from the side-looking sensor. In this case, it is possible to use for example predictive guidance control that is configured to estimate the meeting location of the missile with the target object or to determine a probable meeting location from the respectively available data, and which is furthermore configured to set the meeting angle, in particular the polar angle of the middle axis or center axis vector of the field of view, to the target object. The term predictive guidance control should in this case be understood to mean guidance control that is based on provisional, that is to say predictive, data regarding the meeting location and/or regarding the meeting situation relating to the target object and the missile.

Appropriate predictive guidance control may accordingly be used to control the flight path of the missile such that, based on the respective data that are present regarding the target object and regarding the missile, a probable meeting location exists within the meaning of a prediction, and that the target object remains in the field of view of the side-looking sensor during the target navigation in spite of the lateral alignment of the field of view of the side-looking sensor.

If the orientation, position and/or speed of the target object change and are reflected in a detectable way in corresponding changes in the sensor data from the side-looking sensor, the predictive guidance control may adaptively adjust the orientation or alignment of the missile, that is to say the flight path, while at the same time setting a missile status appropriate for target detection by the side-looking sensor, such that the following two boundary conditions are met: i) a future meeting location is present and ii) the target object is able to be detected by the side-looking sensor. Adaptive adjustment should in this case in particular be understood to mean that the adjustment takes place on the basis of and in response to the changes in orientation, position and/or speed of the target object.

By way of example, by adjusting the roll status of the missile, it is possible to position and to align the missile, and thus the side-looking sensor, such that the target object is located in the azimuthal angle range covered by the field of view. By adjusting the pitch status and/or yaw status, in particular by adjusting the flight angle with respect to the target object, it is possible to set the flight path such that the target object is located, remains or appears in the polar angle range covered by the field of view.

What is known as "trajectory shaping guidance" is suitable for example, but not exclusively, for predictive guidance control, this being known for example from: Paul Zarchan, 2007, Tactical and Strategic Missile Guidance, 5th Edition, ISBN-10: 1-56347-874-9, chapter 25.

Appropriate predictive guidance control in this case takes place at least in the final guidance phase, in particular an interception phase, wherein predictive guidance control may however also be used in previous flight phases.

Should, in spite of the predictive guidance control, the target object move out of the field of view of the side-looking sensor, for example due to evasion maneuvers by the target object, additionally received, updated target object data and/or further sensor data from an additional target detection unit having a field of view concentric to the missile and/or further data regarding the position and alignment of the missile, for example GNSS data (GNSS: global navigation satellite system) may in turn be used to set the orientation of the missile such that the target object moves back into the field of view of the side-looking sensor.

It becomes apparent from the above explanations in particular that the proposed missile controller enables comparatively accurate and reliable guidance in spite of a field of view of the side-looking sensor that is laterally oriented with respect to the missile axis and is not concentric to the missile axis. In the case of implementing a side-looking sensor unit, for example in the region of the missile fuselage, it is furthermore possible to achieve a situation whereby the missile head is available for further functions other than target detection.

According to some refinements, the control unit may be configured, based on the received target object data, which may be considered for example to be representative of prior knowledge regarding position, orientation and/or movement data, such as for example the speed, of the target object, to set the orientation of the missile by actively controlling the pitch, yaw and/or roll angle of the missile such that the target object is located, at least in sections of the guidance, for example in a final guidance phase, within the azimuthal angle range covered by the field of view of the side-looking sensor with respect to the polar axis defined by the longitudinal axis of the missile.

The control unit may in particular be configured such that the roll angle, and therefore the roll status, are set such that the target object, in particular the edges of the target object, is/are at a predefined distance from the edges of the field of view located in the azimuthal angle direction. The robustness of the detection of the target object, that is to say of the object detection, and of the guidance with respect to suddenly occurring evasion maneuvers by the target object is thereby able to be improved. The predefined distance may for example be selected such that it is at least as great as the error, given or to be expected in the azimuthal angle direction and/or polar angle direction, in the object detection of the received target object data and/or of the side-looking sensor.

According to some refinements, the control unit of the missile controller may be configured, based on the target object data, for example representative of prior knowledge regarding position, orientation and/or movement data of the target object, to set the flight path and/or orientation of the missile such that the target object, at least in sections of the guidance, in particular in a final guidance phase, is located within the polar angle range covered by the field of view with respect to the polar axis defined by the longitudinal axis.

The control unit may in particular be configured such that the orientation, for example the alignment of the longitudinal axis of the missile, is able to be set such that the target object, in particular the edges of the target object, is/are at a predefined distance from the field of view edges of the field of view located in the polar angle direction and azimuthal angle direction. The robustness of the detection of the target object, that is to say of the object detection, and of the guidance with respect to suddenly occurring evasion maneuvers by the target object is thereby able to be improved. The predefined distance may for example be selected such that it is at least as great as the error, given or to be expected in each case in the polar angle direction and azimuthal angle direction, in the object detection or the target object recognition, whether based on the received target object data or based on the sensor data from the side-looking sensor.

According to some refinements, the side-looking sensor is configured such that the directional characteristic of the side-looking sensor, for example the azimuthal angle range covered by the field of view, the polar angle range covered by the field of view and/or the alignment of the middle axis of the field of view of the side-looking sensor, is/are able to be adjusted by the missile controller.

By way of example, one or more actuators connected in terms of actuation to a sensor or a sensor array of the side-looking sensor may be present, these actuators being able to be controlled for example by an appropriately configured control unit such that the alignment with regard to the detectable polar angle range and/or azimuthal angle range is/are adjustable, in particular settable. Appropriate actuators may be used for example in the case of optical sensors or sensor arrays or sensors or sensor arrays operating based on infrared light to change or set the alignment of the field of view.

On the other hand, it is also possible for the directional characteristic, for example the alignment, the polar angle range and/or the azimuthal angle range, of the side-looking sensor, for example of a side-looking sensor array having a plurality of side-looking sensors, to be adjusted, in particular set, by changing the operating parameters of the side-looking sensor or of the side-looking sensor array. By way of example, the directional characteristic may be set by appropriately changing the frequency in the case of frequency-toggling antennas. The proposed control units are suitable for example for radar sensors in which the directional characteristic may be adjusted for example by adjusting the frequency, phase and/or amplitude. Respective control functions may be taken over for example by the control unit, already mentioned further above, of the missile controller. As an alternative, one or more additional control units may also be present and may set the directional characteristic of the side-looking sensor.

According to some refinements, the side-looking sensor and in particular a corresponding control unit are configured to adjust, in particular to set, the directional characteristic of the side-looking sensor based at least on sensor data from the side-looking sensor such that the target object is located within the field of view of the side-looking sensor at least in sections along the flight path of the missile.

The robustness of the target detection and guidance is able to be improved with an appropriately configured control unit and an appropriately configured side-looking sensor.

According to some refinements, the control unit may be configured to detect a target object located in the field of view, in particular the target object as such, and to determine its position, orientation and/or speed based on sensor data from the side-looking sensor. The control unit may furthermore be configured, based on the determined position, orientation and/or speed of the target object, to determine a flight path for the adaptively active, predictive guidance of the missile to a provisional meeting location with the target object. Based on the determined flight path, the missile may be guided by the missile controller to the provisional, that is to say predictive, meeting location with the target object. When determining the flight path, in addition to the sensor data from the side-looking sensor, further data, for example regarding orientation, position and/or speed of the missile, may furthermore be taken into consideration.

According to some refinements, the control unit may be configured to perform at least one of the following steps in the context of the adaptively active, predictive guidance, for example iteratively:

predictively determining the provisional meeting location of the missile with the target object and determining a meeting angle of the missile with the target object such that the field of view comprises a direct line of sight onto the target object; and predictively determining the flight path and/or the orientation of the missile, in particular with regard to roll, pitch and/or yaw angle of the missile, such that the target object is at a predefined distance from field of view edges of the field of view in the azimuthal and/or polar angle direction with respect to the longitudinal axis of the missile as polar axis, preferably such that the target object is located roughly in the middle of the field of view in the azimuthal and/or polar angle direction.

The meeting angle should in this case in particular be understood to mean the angle measured between a trajectory of the target object and the trajectory of the missile.

The predefined distance may in this case be selected such that the target object, plus the error in the recording of the sensor data from the side-looking sensor or the error in the target object data, is located in the field of view. Through suitably selected distances and central alignment of the direct line of sight in the field of view, it is possible, for the guidance, in particular to achieve advantages in terms of sudden evasion maneuvers by the target object, since, in the case of a target object located centrally in the field of view, the probability of a spontaneous evasion maneuver leading to the target object moving out of the field of view is comparatively low. The guidance in an interception phase of the guidance may in particular be made robust against sudden evasion maneuvers by the target object.

According to some refinements, the missile controller may furthermore comprise, that is to say in addition to the at least one side-looking sensor, at least one target-seeking sensor having a field of view concentric to the longitudinal axis of the missile. In this case, the target-seeking sensor having a concentric field of view should in particular comprise target-seeking sensors in the case of which the field of view is aligned concentrically to the longitudinal axis of the missile or is able to be aligned concentrically with respect to the middle axis of the field of view. In such refinements, the missile controller, in particular a control unit of the missile controller, may be designed, in order to guide the missile, in particular in order to detect the target object, to furthermore use data recorded by the target-seeking sensor, for example surroundings data, terrain data and/or data regarding the target object, such as position, orientation and/or speed.

When using an additional target-seeking sensor having a concentric field of view to the longitudinal axis of the missile, the guidance is able to be further improved.

Such target-seeking sensors having a field of view concentric to the longitudinal axis of the missile, in particular having a field of view able to be aligned concentrically to the longitudinal axis of the missile, may be integrated or mounted in the missile tip in a known manner, for example. If such target-seeking sensors are not used in the context of the present invention, the missile tip may be functionalized in another way, for example by way of a heat shield and the like.

According to some refinements, the side-looking sensor or the target-seeking sensor may comprise one or more optical sensors, one or more infrared sensors and/or one or more radar sensors. In such refinements, the missile controller, in particular a control unit of the missile controller, may be configured to determine the position, the orientation and/or the speed of a detected target object from sensor data from respective sensors. In some refinements, it is also possible for the missile controller to be designed to determine information regarding the surroundings, for example a terrain topography, from the sensor data, and to take it into consideration in the guidance, for example in order to determine or calculate the flight path, the orientation of the missile, the meeting angle and/or the yaw, pitch and/or roll status of the missile.

According to some refinements, the missile controller may furthermore be configured to set the azimuthal angle range, defined with respect to the longitudinal axis of the missile as polar axis, of the field of view and the polar angle range, defined with respect to the longitudinal axis of the missile as polar axis, of the field of view and/or to control the flight path and the orientation of the missile such that at least one of the following conditions is/are met:

the azimuthal angle range and/or the polar angle range are/is set to be greater the greater the error in the determination of position, orientation and/or speed of the target object;

the azimuthal angle range and/or the polar angle range are/is set in a final guidance phase, in particular in an interception phase, such that they/it are/is greater than the error in the determination of position, orientation and/or speed of the target object;

the azimuthal angle range and/or the polar angle range are/is set greater the greater the speed of the target object; and the polar angle, defined with respect to the longitudinal axis of the missile as polar axis, of the middle axis of the field of view is set depending on a determined speed of the target object, wherein the polar angle is set smaller the smaller the speed of the target object.

The error resulting from the sensor data or the target object data may be used as a measure for the error, for example. The error may be linked to the corresponding data, for example in the form of metadata, and transmitted.

When the missile controller is operated in accordance with one of the abovementioned conditions, in the final guidance phase, in particular in an interception phase, it is possible for example to achieve comparatively reliable guidance to the provisional meeting location.

According to some refinements, what is provided is a missile, in particular a guided missile, that contains a missile controller according to one of the refinements described herein according to the invention. The missile controller may for example be mounted or integrated such that it is positioned between the head-side and drive-side end of the missile.

By way of example, the missile controller, in the case of a guided missile, may be arranged, in particular mounted or integrated, in the region of the guidance part of the guided missile, on which algorithms for guiding the missile may be executed based on appropriate control units. Such positioning of the missile controller in particular has the advantage that comparatively short signal paths are able to be implemented between the control units of the guidance part and the control unit of the missile controller. The control unit of the missile controller may, in some refinements, be formed in a manner at least partly functionally integrated with the guidance part.

According to some refinements, the middle axis of the field of view with respect to the longitudinal axis of the missile may have a radial component and an axial component. The side-looking sensor may be arranged, in particular mounted or integrated, with respect to the longitudinal axis of the missile such that the radial component is aligned substantially parallel to a maneuvering plane of the missile in which the missile has a maximum transverse acceleration capability. This means that the radial component is aligned parallel to a high-performance maneuvering plane of the missile. The axial component may be aligned parallel to the longitudinal axis of the missile.

A maneuvering plane of the missile is understood to mean a plane in which a missile performs a flying maneuver in a respective movement situation. In the case of a guided missile, the maneuvering planes may be referred to as guidance planes. By way of example, in the case of assumed horizontal flight of the missile, a yaw movement lies in a horizontal maneuvering plane parallel to the longitudinal axis of the missile, that is to say in a horizontal yaw plane. Accordingly, in the case of a pitch movement, the maneuvering plane, in the case of assumed horizontal flight of the missile, lies in a vertical maneuvering plane parallel to the longitudinal axis of the missile, that is to say in a pitch plane. The same applies to any flying movements and flying maneuvers of the missile.

An alignment of the radial component parallel to a high-performance maneuvering plane is advantageous in particular with regard to adaptively predictive guidance of the missile in the event of sudden evasion maneuvers by the target object, since the missile is then able to adjust the alignment of the side-looking sensor comparatively quickly to changed conditions concerning the position, orientation and/or speed of the target object. Adjustment to respectively changing conditions should be considered in particular to be adaptive guidance. The term "predictive" or "predictively" is in particular intended to mean that the guidance takes place on the basis of a provisional, that is to say predictive, meeting location.

According to some refinements, what is provided is a method for guiding a missile, in particular a guided missile, according to one of the refinements described herein in the context of the underlying invention. The method in this case contains guiding the missile along a flight path to a stationary or moving target object.

According to some refinements, the method comprises at least the following steps performed by the missile controller of the missile:
receiving data regarding the position, orientation and/or speed of the target object;
aligning the field of view of the side-looking sensor onto the target object by aligning the side-looking sensor by controlling the directional characteristic of the side-looking sensor, by aligning the missile and/or by setting the flight path of the missile based on the received data such that the target object, in a first flight phase, moves into the field of view of the side-looking sensor, in particular is located in the field of view of the side-looking sensor; and
during a second flight phase following the first flight phase, aligning the field of view onto the target object by controlling the directional characteristic of the side-looking sensor, the orientation and/or the flight path of the missile based on the sensor data from the side-looking sensor such that the target object is located in the field of view, in particular remains in the field of view.

According to some refinements, in order to align the field of view onto the target object, the roll, pitch and/or yaw angle of the missile may be adaptively actively set, in particular changed appropriately when necessary, based on the determined sensor data from the side-looking sensor.

According to some refinements, the field of view is aligned such that the target object, at least in sections in the flight phases, preferably in a final guidance phase, is located within the azimuthal angle range and/or polar angle range covered by the field of view with respect to the polar axis defined by the longitudinal axis of the missile.

According to some refinements, the respective angles, that is to say roll, pitch and/or yaw angle, may be set such that the target object is at a predefined distance from the field of view edges located in the azimuthal angle or polar angle direction. The distance may in this case be greater than the error in the target object recognition, that is to say the error in the recognition of target object data, such as for example the position, the orientation, the speed, the size and/or the outline of the target object.

According to some refinements, the method may furthermore comprise:
adaptively actively guiding the missile, based on a position, orientation and/or speed of the target object as determined from sensor data from the side-looking sensor, wherein the adaptively active guidance comprises at least one of the following steps:
determining a meeting location, in particular a provisional meeting location, of the missile with the target object, in particular in a final flight phase, and setting a flight angle of the missile in relation to the target object such that the field of view of the side-looking sensor contains a direct line of sight onto the target object, wherein the direct line of sight may for example substantially match the middle axis of the field of view;
determining the flight path and/or the orientation, in particular the alignment, such as roll, pitch, yaw status, of the missile and/or of the flight angle in relation to the target object such that the target object, in the azimuthal and/or polar angle direction, is at a predefined distance from respective field of view edges of the field of view, preferably such that the target object is located roughly in the middle of the field of view in the azimuthal and/or polar angle direction; and recording sensor data by way of a target-seeking sensor, different from the side-looking sensor, having a field of view aligned concentrically to the longitudinal axis of the missile, and determining the flight path, the orientation and/or the flight angle of the missile furthermore based at least partly on the sensor data from the target-seeking sensor having a field of view aligned concentrically to the longitudinal axis.

The sensor data from the further target-seeking sensor, provided that this is already able to detect the target object, may also for example be used in the first flight phase to align the missile such that the side-looking sensor is able to detect the target object, wherein, in some refinements, sensor data from both sensors may be used for guidance following successful alignment of the side-looking sensor.

According to some refinements, the position, orientation and/or speed of the target object may be determined at least based on sensor data from the side-looking sensor and/or the target-seeking sensor, wherein the sensor data may for example comprise data from at least one infrared sensor, at least one optical sensor and/or at least one radar sensor.

Based on the determined position, also containing for example data regarding the size and/or the outline of the target object, the determined orientation and/or the determined speed of the target object, according to some refinements, at least one of the following steps may be performed:

setting or controlling the orientation and/or the flight path of the missile based on the determined position, orientation and/or speed of the target object;

setting a greater azimuthal angle range for the side-looking sensor the greater the error in the determination of position, orientation and/or speed of the target object;

setting the azimuthal angle range of the side-looking sensor such that this is greater, at least in a final guidance phase, than the error in the determination of position, orientation and/or speed of the target object;

setting the azimuthal angle range and/or the polar angle range of the side-looking sensor on the basis of the determined speed of the target object; and setting the polar angle of the middle axis of the field of view on the basis of the determined speed of the target object, wherein the polar angle of the middle axis is set smaller the smaller the speed of the target object.

According to some refinements, the step of aligning the field of view of the side-looking sensor may furthermore contain: setting the settably designed azimuthal angle range, the settably designed polar angle range and/or aligning the alignably designed central field-of-view axis of the field of view, wherein the setting and/or alignment is performed based at least on sensor data from the side-looking sensor, in particular such that the target object is located within the field of view at least in sections along the flight path.

Method-related advantages become apparent in particular from the device-related advantages of the invention.

It is pointed out explicitly at this juncture that functional and/or structural features of refinements of the missile controller according to the invention and of the missile and method-related features of refinements of the method according to the invention, unless already described explicitly, may then however also be implemented and claimed at least based on the back-references in the patent claims, including in the respective other category.

The term "in particular" used in the course of the description of inventive refinements and embodiments and in the claims should not be understood to be restrictive, but rather (only) to the extent that the features identified by "in particular", unless stated otherwise, relate to special refinements or embodiments.

Other features which are considered as characteristic for the invention are set forth in the appended claims.

Although the invention is illustrated and described herein as embodied in a method for guiding a missile, a missile controller and a missile, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 10 is a block circuit arrangement regarding the side-looking sensor according to the exemplary embodiment of FIG. 9.

DETAILED DESCRIPTION OF THE INVENTION

Figure 1:
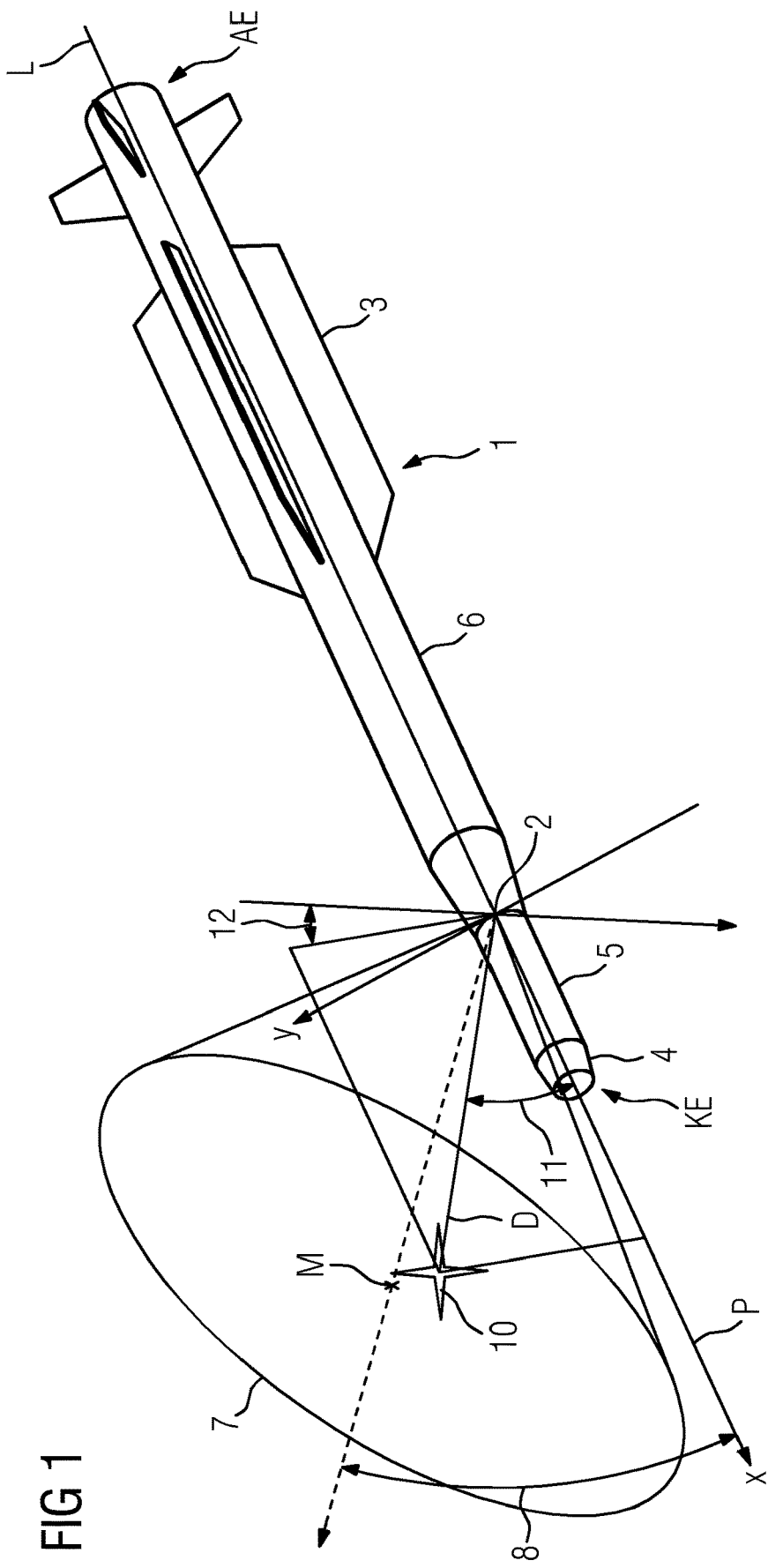
FIG. 1 is a diagrammatic, perspective view of a guided missile having a side-looking sensor.

The following is a summary list of reference numerals and the corresponding structure used in the above description of the invention.

Referring now to the figures of the drawings in detail and first, particularly to FIG. 1 thereof, there is shown an exemplary embodiment of a missile 1 configured according to the invention, wherein the missile 1 is for example a guided missile 1. The missile 1 contains a side-looking sensor 2.

The missile 1 has a drive 3, which defines a drive-side end AE of the missile 1. At the end facing away therefrom in the direction of the longitudinal axis L, the missile 1 has a missile head 4 that defines a head-side end KE. At the drive-side end AE, the missile 1 has a plurality of fins, not illustrated in any more detail, for guidance or for flight stabilization.

At a segment adjoining the missile head 4, the missile 1, in the direction of the drive-side end AE, has a guidance part 5 which is adjoined by a warhead 6 in the direction of the drive 3. Apart from the drive 3 and missile head 4, the structure in the longitudinal direction of the missile 1 may also deviate from the structure that is shown.

The guidance part 5 contains one or more control units for guiding the missile 1. In the present example, the side-looking sensor 2 is mounted in the region of the guidance part, wherein associated sensors are integrated on a longitudinal-side circumferential surface. This offers the advantage of short signal paths, for example between side-looking sensor 2, an associated missile controller and the control units of the guidance part 5. It is furthermore also possible to achieve aerodynamic advantages in comparison with different mounting.

As indicated by the cone in FIG. 1, the side-looking sensor 2 has a field of view 7 that is not concentric to the longitudinal axis L.

In the illustrated example, the field of view 7 is described by a right-hand spherical coordinate system fixed with respect to the missile and whose origin is located on a sensor surface of a sensor of the side-looking sensor 2. This spherical coordinate system has a polar axis P running parallel to the longitudinal axis L, wherein the direction of the positive polar axis P is defined by the direction running from the drive-side end AE to the head-side end KE. A vector running in the positive direction of the polar axis P is also referred to below and herein as polar axis vector.

The field of view 7 in the example shown is concentric to a middle axis M, wherein the vector starting from the coordinate origin of the spherical coordinate system, pointing away from the missile 1 and running through the middle axis M is referred to hereinafter as middle axis vector.

The middle axis polar angle 8 defined between the polar axis vector and the middle axis vector, in the example shown, is an acute positive angle other than zero.

Angles running in the circumferential direction with respect to the polar axis vector are referred to hereinafter as azimuth angles.

As may be seen from FIG. 1, the side-looking sensor 2, in the direction parallel to the polar axis vector, has a laterally aligned field of view 7, wherein the field of view 7 is in this respect restricted in the direction of the polar axis vector, but is not in any case concentric to the polar axis vector.

FIG. 1 illustrates, schematically and by way of example and without depicting the actual distance true to scale, a target object 10 located in the field of view 7.

In the coordinate system of the side-looking sensor 2, the position of the target object 10 may be described by the distance D to the coordinate origin, the polar angle theta, denoted 11, and the azimuthal angle phi, denoted 12.

If for example a radar sensor is used for the side-looking sensor 2, the distance D, the polar angle theta 11 and the azimuthal angle phi 12 as well as other parameters, such as for example status, position, orientation and/or speed of the target object 10, may be determined in a known manner from radar signals that are reflected from the target object 10 and received by the side-looking sensor 2. The same applies to other types of sensor, such as infrared sensors and optical sensors, which likewise come into consideration for the side-looking sensor 2.

Figure 2:
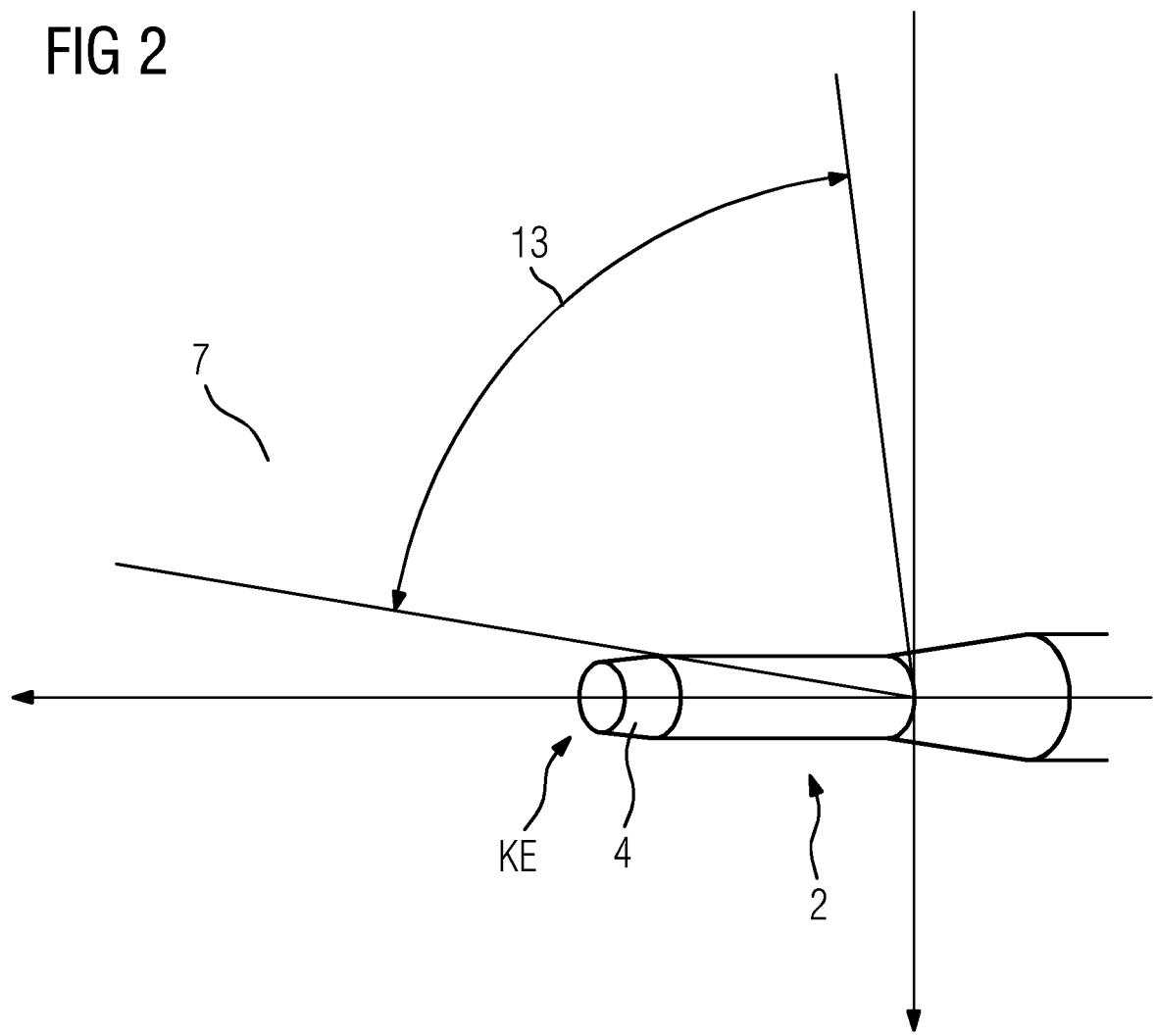
FIG. 2 is a side, perspective view in a region of the guided missile tip with respect to a polar main plane running through the polar axis.

FIG. 2 shows a side profile view of the missile 1 in the region of the missile tip, that is to say the head-side end KE, with respect to the polar main plane, running through the polar axis P and the coordinate origin, of the spherical coordinate system. As is apparent from FIG. 2, the field of view 2 covers a certain polar angle range 13 in the polar main plane.

Figure 3:
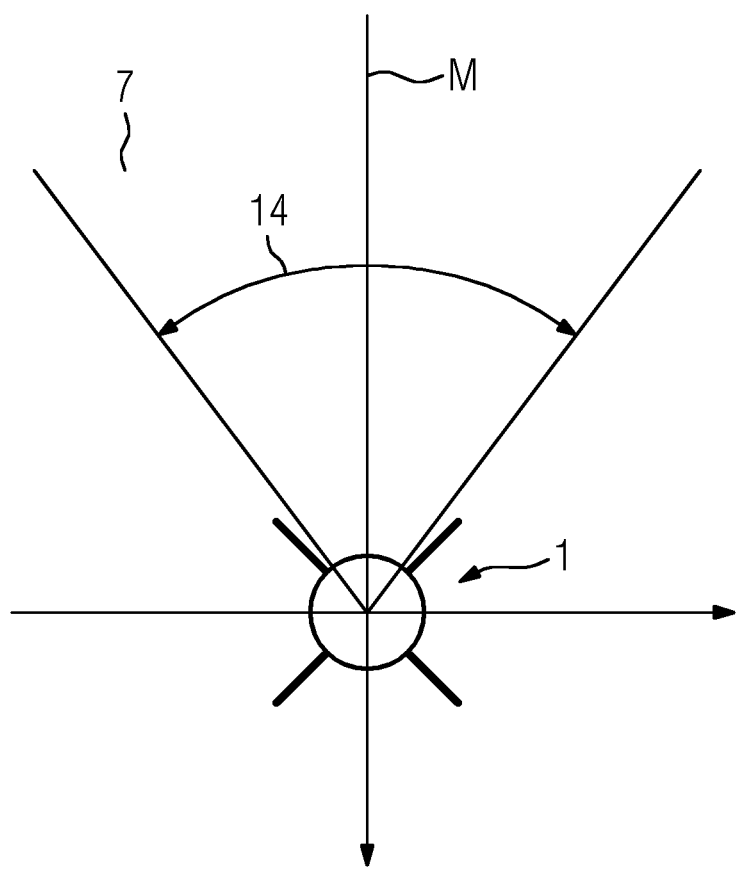
FIG. 3 is a sectional profile view, perpendicular to the side profile view of FIG. 2, of the missile 1 with respect to the azimuthal main plane running perpendicularly through the polar axis.

FIG. 3 shows a sectional profile view, perpendicular to the side profile view of FIG. 2, of the missile 1 with respect to the azimuthal main plane, running perpendicularly through the polar axis P and the coordinate origin, of the spherical coordinate system. As is apparent from FIG. 3, the field of view 7 covers a certain azimuthal angle range 14 in the azimuthal main plane.

Looking at FIG. 2 and FIG. 3 together, it becomes particularly apparent that the field of view 7 of the side-looking sensor 2 is restricted to a spatial region aligned laterally with respect to the longitudinal axis L and that is not concentric to the longitudinal axis L.

Figure 4:
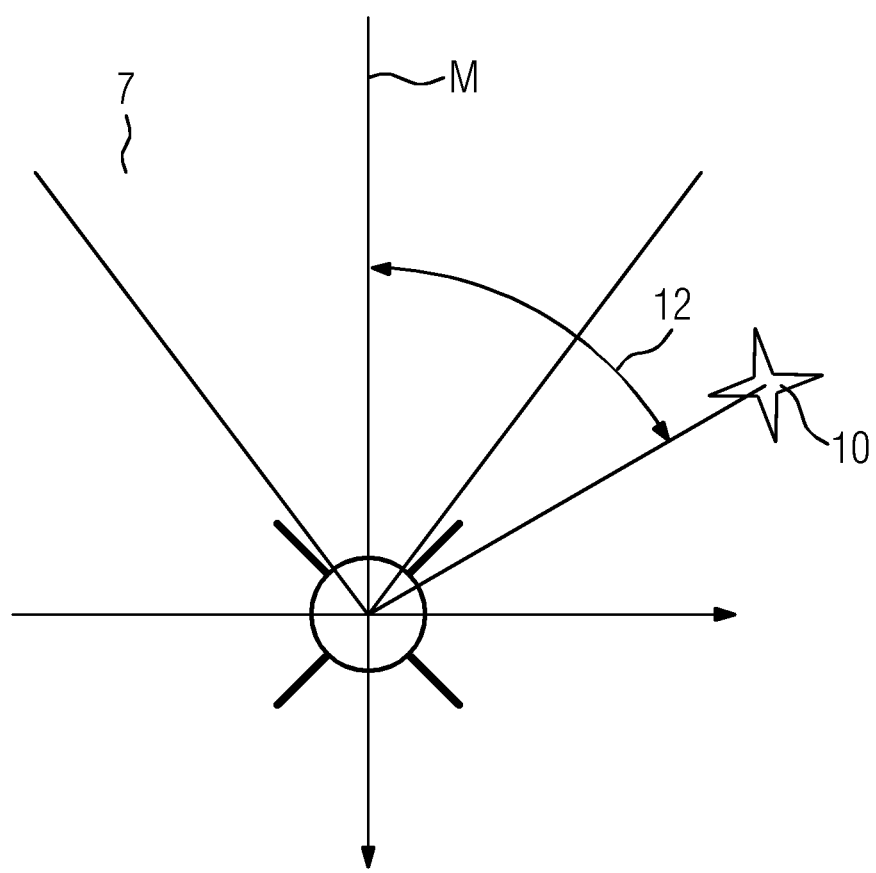
FIG. 4 is a sectional profile view showing the projection view from FIG. 2 with a target object located outside the field of view.

FIG. 4 shows an illustration, corresponding to the sectional profile view of FIG. 3, containing a target object 10 that is located outside the field of view 7. On account of the field of view 7 pointing laterally away from the longitudinal axis L, it is generally insufficient for the sensor arrangement, that is to say the side-looking sensor 2 having a field of view 7 not concentric to the longitudinal axis L, to align the head-side end KE of the missile 1 onto the target object 10 on its own.

To this end, the missile controller of the missile 1 is specifically configured to allow efficient detection of the target object 10 by way of the side-looking sensor 2.

The missile controller, for example a corresponding control unit, is specifically configured to receive target object data regarding the target object 10, for example from a transmission unit of a firing platform or a supervision unit, via a reception unit (not shown in any more detail, but already described in more detail further above).

The target object data may for example comprise data regarding the position, orientation and/or speed of the target object 10.

The target object data may be determined for example by way of a sensor system, for example based on radar technology or other sensor technologies, wherein the target object data are determined independently of the side-looking sensor 2. By way of example, the position or status of the target object may be determined before the missile 1 is launched by a radar system of a firing unit assigned to the firing platform. Appropriate target object data may then be transmitted to the missile 1 before the missile 1 is launched or even after it is launched.

After the missile 1 is launched, appropriate target object data may be transmitted to the missile 1 should this be necessary, for example, if the target object 10 detected once by the side-looking sensor 2 disappears from the field of view 7 again and/or if further data are necessary in order to increase the accuracy of the guidance.

In the situation shown in FIG. 4, the target object 10 is not located in the field of view 7 of the side-looking sensor 2. However, the missile controller is configured, based on the received target object data, to set the orientation, in particular the roll status, of the missile 1 such that the target object 10 moves into the field of view 7 of the side-looking sensor 2, but moves at least into the azimuthal angle range 14 covered by the field of view 7.

Despite the laterally aligned field of view 7, which is not expedient for guidance, of the side-looking sensor 2, it is thereby still possible to achieve efficient guidance based on the received target object data that are representative of prior knowledge about the target object 10. After the target object 10 has been detected by the side-looking sensor 2, the guidance and target recognition may be based at least partly on sensor data from the side-looking sensor 2.

Figure 5:
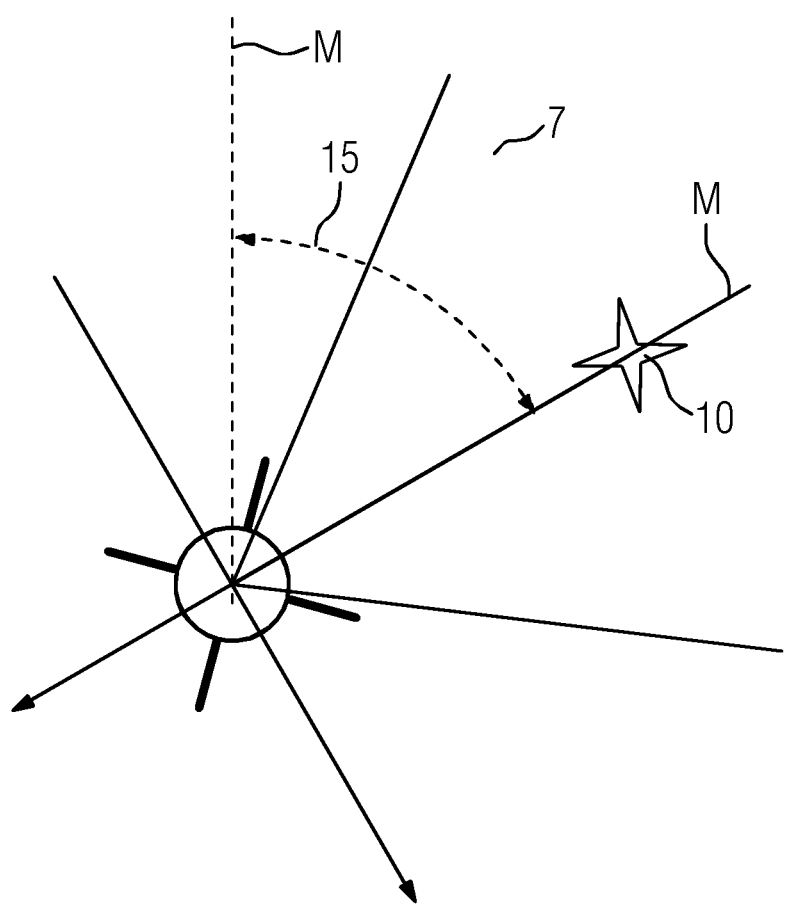
FIG. 5 is a sectional profile view showing a projection view according to FIG. 2 with the target object located in the field of view.

An alignment of the missile 1 in the direction of the target object 10 based on target object data is shown by way of example in FIG. 5.

The missile 1 is aligned in the same way in the event that the side-looking sensor 2 has detected the target object 10 and the position and status of the target object 10 changes in relation to the field of view 7. In this case, sensor data from the side-looking sensor 2 regarding the target object 10 may be used, wherein a corresponding alignment of the missile 1 corresponds to an adjustment of the alignment of the field of view 7 that takes into consideration the circumstances changed by the relative movement of the missile 1 and target object 10.

In the situation shown in FIG. 5, the target object 10 is located in the field of view 7, that is to say in the detection region, of the side-looking sensor 2. To be able to appropriately align the missile 1, the missile controller is configured, based on the received target object data, in particular to control the roll status of the missile 1 such that the roll angle 15 of the missile 1 is changed or set such that the rotation thereby caused, about the longitudinal axis L, of the field of view 7 brings the target object 10 into the detection range, covered by the field of view 7 in the azimuthal angle direction, of the side-looking sensor 2. FIG. 5 indicates the setting or changing of the roll status, that is to say the roll angle 15, in comparison with the situation in FIG. 4 by dashed lines that show first the position of the middle axis M according to FIG. 4 and second the roll angle 15.

After the missile 1 has been oriented or aligned such that the target object 10 is located in the field of view 7 of the side-looking sensor 2, guidance to the target object 10 may take place at least partly using the sensor data from the side-looking sensor 2. To this end, the missile controller may accordingly be configured to track the target object 10 based on the sensor data from the side-looking sensor 2 and to guide the missile 1 towards the target object 10 to a provisional meeting location between the missile 1 and target object 10, that is to say predictively.

Apart from setting or controlling the roll status, that is to say the roll angle 15, it is accordingly also possible to set pitch and yaw angles of the missile 1, so that the target object 10 moves into the field of view 7 of the side-looking sensor 2.

The roll, pitch and yaw angles, after the target object 10 has been detected based on sensor data from the side-looking sensor 2, may be appropriately controlled such that the target object 10 remains in the field of view 7 and the missile 1 is at the same time guided along a flight path to the provisional meeting location.

Figure 6:
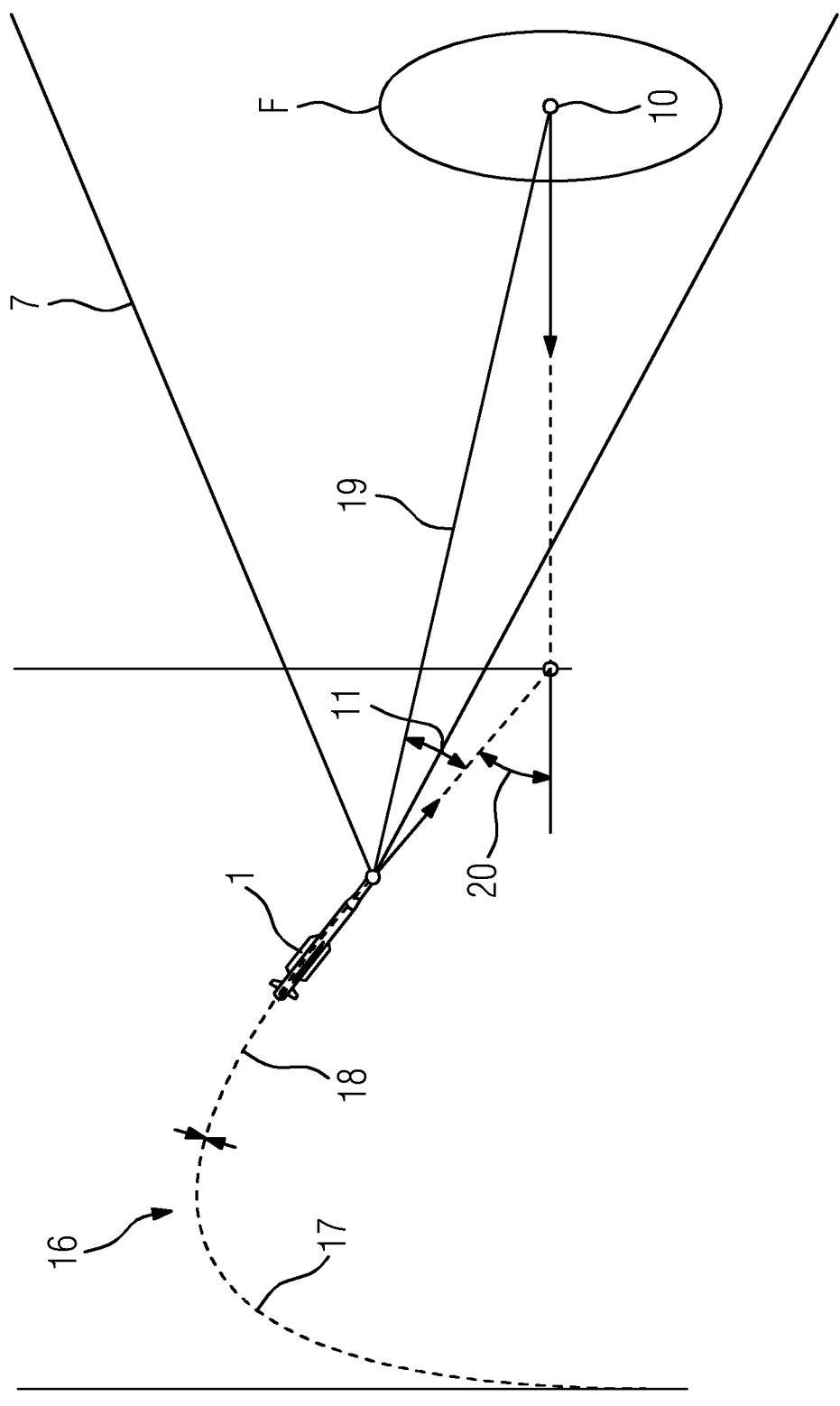
FIG. 6 is an illustration showing a schematic illustration of a missile moving along a flight path.

With reference to FIG. 6, which shows a schematic illustration of a missile 1 moving along a flight path 16, a description is given below of a possible guidance sequence, that is to say target navigation sequence, of the missile 1, wherein the target navigation is based at least partly or in sections along the flight path 16 on the received target object data and the sensor data from the side-looking sensor 2.

The flight path 16 of the missile 1, in the case of guidance towards the target object 10, may be divided into an approach phase 17 and an interception phase 18. In the approach phase 17 of approaching the target object 10, target object data are transmitted to the missile controller which, as already described, were recorded by way of a sensor source external to the missile 1, for example a firing platform, a ground radar or a sensor network.

The target object data are representative of prior knowledge about for example the position of the target object 10, the orientation of the target object 10 and the speed of the target object 10, wherein the parameters or data may each also be used or be present as relative data, that is to say in relation to corresponding data of the missile 1. To this end, the missile controller may for example use available data regarding position, orientation and/or speed of the missile 1 from inertial navigation and other internal or external sources, such as for example external or internal sensors, in particular GNSS sensors, in order to determine or to calculate corresponding absolute or relative variables.

If the missile 1 has one or more further target-seeking sensors in addition to the side-looking sensor 2, the missile controller may also determine target object data, in particular in relation to the missile 1, at least partly based on sensor data from the one or more further target-seeking sensors.

Since, in the approach phase 17 after the missile 1 is launched, it is not necessarily ensured that the missile 1 is aligned such that the target object 10 is optimally located and detectable with respect to the field of view 7 of the side-looking sensor 2, the missile controller has a function for setting the orientation, for example the roll status, of the missile 1 such that the field of view 7 is able to be aligned appropriately onto the target object 10, in particular on the basis of target object data.

Based on a provisional, that is to say predictive, meeting location, the missile controller may set and/or control the orientation of the missile 1 and/or determine an appropriate flight path 16 such that the side-looking sensor 2 has a direct line of sight towards the target object 10 (in the same way as for the direct line of sight 19 shown in FIG. 6 for the interception phase 18).

By way of example, what is known as "trajectory shaping guidance" may be used to set an appropriate meeting angle 20 between the missile 1 and target object 10. By appropriately setting the meeting angle 20, the polar angle theta 11 of the target object 1 is also set in the coordinate system of the side-looking sensor 2.

As already described, the missile controller is designed to control or to regulate the roll angle 15 of the missile 1 in particular such that the target object 1 preferably comes to be located centrally with respect to the azimuthal angle range 14, covered by the field of view 7, of the side-looking sensor 2. According to some refinements, there may be provision for the roll angle 15 to be controlled such that the target object 1 comes to be located at a predefined distance from the field of view edge of the field of view 7. With appropriate setting of the orientation or alignment of the field of view 7, it is possible to achieve a situation whereby, in the interception phase 18 following the approach phase 17, the target detection based on sensor data from the side-looking sensor 2 is robust against any evasion maneuvers by the target object 10 and thus linked changes in the line of sight, in particular with respect to the polar angle 11. The explanations regarding the roll angle 15 apply accordingly to the yaw and pitch angle of the missile 1.

In the interception phase 18 following the approach phase 17, the missile controller may guide the missile 1 to the provisional meeting location based on prior knowledge, that is to say based on received data regarding the target object 10, and/or based on sensor data from the side-looking sensor 2 about the orientation, position and speed of the target object 10. To this end, it is possible to use for example target-seeking guidance, such as for example proportional navigation (known for example from Paul Zarchan, 2007, Tactical and Strategic Missile Guidance, 5th Edition, ISBN-10: 1-56347-874-9, chapter 6).

It may be particularly advantageous for the orientation of the missile 1 to already be set in the approach phase 17 such that the target object 10 is at the greatest possible distance from the field of view edge of the field of view 7. If this is the case, if there is a sufficiently large field of view 7 or one set to be sufficiently large, in the case of moving target objects 10, the further guidance may take place without particular reference to the polar angle theta 11 in the context of expected evasion maneuvers by the target object 10. In order to intercept stationary or static target objects, what is known as "trajectory shaping guidance" may for example however also be necessary and be used, by way of which an expedient polar angle theta 11 for the target object 10 is also able to be achieved in the interception phase 18.

In addition, the roll angle 15 of the missile 1 is also regulated or set in the interception phase 18 such that the target object 10 is located optimally in the detectable azimuthal angle range 14 of the side-looking sensor 2.

It is apparent that the described missile controller or a corresponding method may be used to achieve efficient guidance of the missile 1.

In order for a target object 10 to be able to be detected in the front half-space of the missile 1 at a sufficient distance in combination with suitable guidance of the missile 1, it is advantageous for the field of view 7 to have a sufficiently large polar angle range 13 and a sufficiently large azimuthal angle range 14.

The missile controller and the side-looking sensor 2 are advantageously configured such that the error in the determination of the orientation and/or the position of the target object 10, at least in the approach phase 17 when transitioning to the interception phase 18 and possibly also in other flight phases, is smaller, in particular significantly smaller, than the detection range respectively covered by the field of view 7 and which is defined by the azimuthal angle range 14 and the polar angle range 13 of the side-looking sensor 2. The error F in the data regarding the target object 10 (illustrated in FIG. 6 by an error circle running around the target object 10), whether based on the received target object data or on sensor data from the side-looking sensor 2, is preferably smaller than the distance from the target object 10 to the field of view edge of the side-looking sensor 2.

It may furthermore be advantageous with regard to efficient guidance for the detection range of the field of view 7 of the side-looking sensor 2 to be configured to be sufficiently large, depending on the expected dynamics of the target object 10, so that the target object 10 continues to remain in the detection range of the field of view 7 in the event of unexpected evasion maneuvers. In the event of slowly moving target objects 10, it is advantageous for the polar angle range 13 of the side-looking sensor 2 to extend as far as possible forwards in the direction of the missile head 4 so that, when the missile 1 is guided towards the slowly moving target object 10, it is possible to set an appropriate polar angle 8 of the middle axis M.

If there are preferred maneuvering planes of the missile 1, the side-looking sensor or sensors 2 may expediently be integrated in an aligned fashion such that the radial component of the middle axis M of the field of view 7 is aligned in the direction of a maneuvering plane of the missile 1 in which the transverse acceleration capability is comparatively great, in particular is at a maximum. A corresponding schematic illustration is given in FIG. 7.

Figure 7:
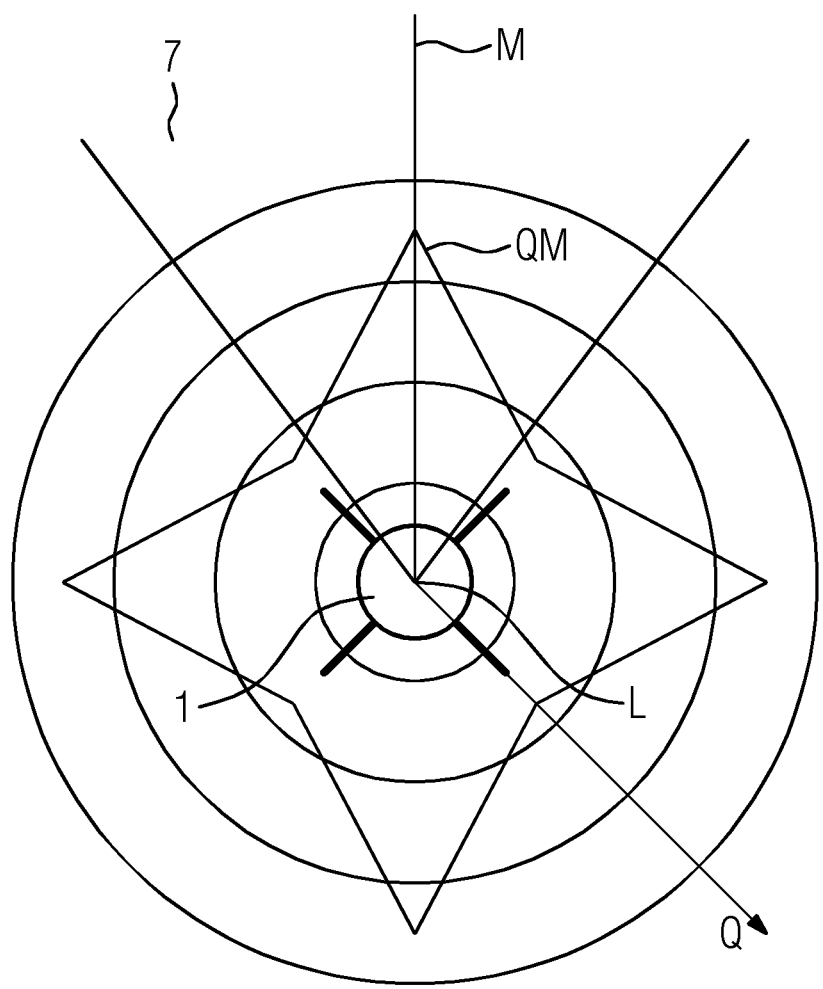
FIG. 7 is a schematic illustration regarding a mounting location of the side-looking sensor on the guided missile.

FIG. 7 shows first the field of view 7 and second, in a circular coordinate system whose origin coincides with the longitudinal axis L, the transverse acceleration capability Q of the missile 1.

As illustrated in FIG. 7, at least the radial component of the middle axis M of the field of view 7 coincides with a direction of maximum transverse acceleration capability QM, which means that the detection range of the side-looking sensor 2 is aligned the same as a high-performance maneuvering plane of the missile 1. Such a sensor arrangement in particular has the advantage that it is possible to respond particularly quickly to changes in the status of the target object 10 in the field of view 7 of the side-looking sensor 2, for example due to evasion maneuvers by the target object 10.

The side-looking sensor 2 and any further target-seeking sensors are not restricted to radar sensors, but it is possible to use essentially any kind and combination of sensors that are able to be integrated into a missile 1 and that make it possible to record position, orientation and/or speed information about a target object 10. Optical sensors in the infrared or visual region or radar sensors are suitable by way of example, but not exclusively.

Apart from mounting or integrating the side-looking sensor 2 on the guidance part 5, the side-looking sensor 2 or even a plurality of side-looking sensors may be arranged laterally along the missile body of the missile 1 at any suitable locations.

In order for the spatial angle range respectively needed or required for guidance and target object tracking to be able to be recorded, it is possible first for the side-looking sensor 2 and possibly further target-seeking sensors to have a fixedly aligned field of view 7 that is configured for example to record a relatively large spatial region, and secondly for them to have a smaller field of view 7 that is able to be aligned mechanically or in another way within the recordable spatial region.

Figure 8:
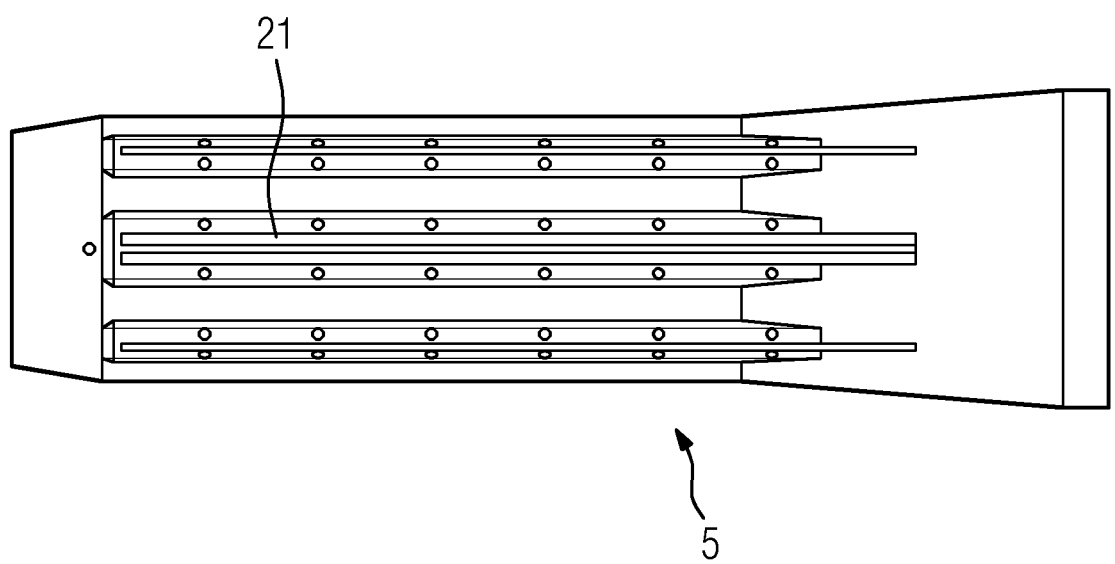
FIGS. 8 and 9 are illustrations showing an exemplary embodiment regarding the arrangement of radar antennas in the case of the side-looking sensor.
Figure 9:
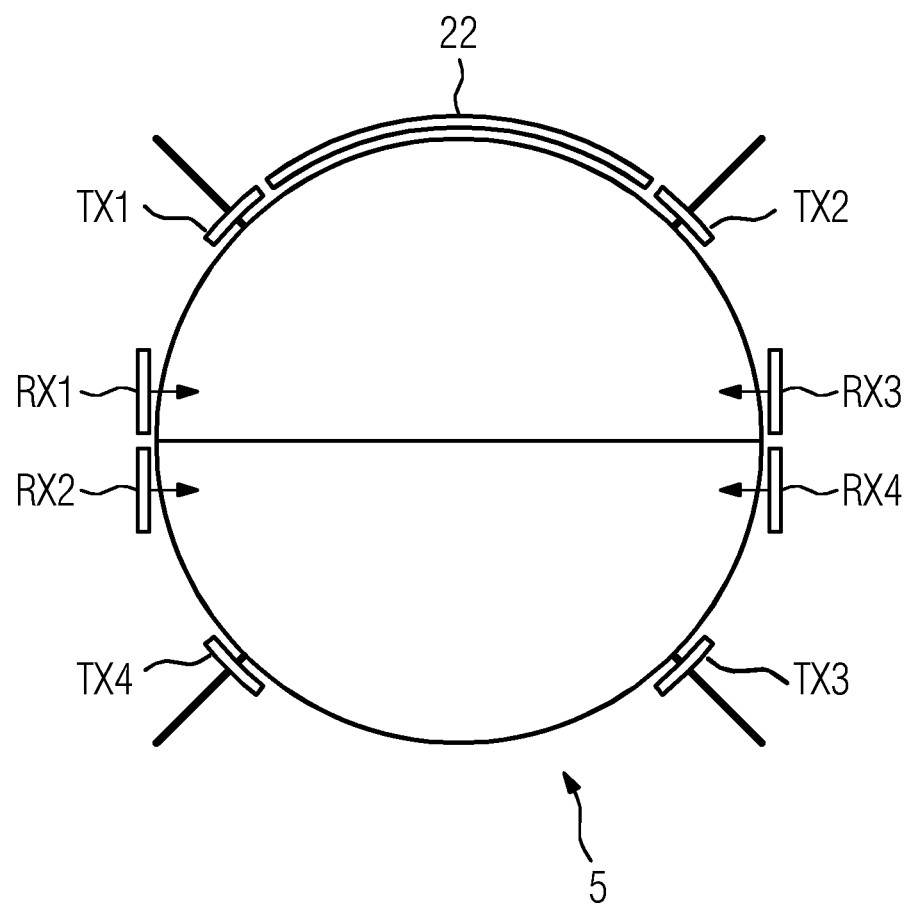

FIG. 8 and FIG. 9 show an exemplary embodiment regarding the arrangement of radar antennas for implementing a side-looking sensor 2. The expansion of the diameter of the missile 1, resulting at least from the drawing of FIG. 9, as a result of arranging the radar antennas is shown only to clarify the drawing. It is generally not necessary to expand the diameter.

The side-looking sensor 2 contains radar antennas 21 arranged on the circumference of the missile body, these radar antennas being described in even more detail in connection with FIG. 9. In the example shown in FIG. 8, the missile 1 contains an optional GNSS sensor 22, which may be used for example to determine position data of the missile 1. Position data and/or speed data of the missile 1 may additionally or alternatively be determined on the basis of an inertial reference unit (not shown).

The side-looking sensor 2 shown in the exemplary embodiment of FIG. 9 is configured in particular for a missile 1 having four high-performance maneuvering planes, as has been described in connection with FIG. 7. A missile 1 equipped with such a side-looking sensor 2 is suitable in particular for intercepting relatively fast-moving target objects 10 in the air.

The side-looking sensor 2 contains four transmit antennas TX1 to TX4 and two pairs formed in each case of two receive antennas RX1, RX3 and RX2, RX4, this also being illustrated in FIG. 9.

The radar antennas TX, RX are arranged in a manner distributed on the circumference of the guidance part 5, wherein the individual radar antennas in the present example are in the form of surface wave antennas or in the form of substrate-integrated leaky-wave antennas, accordingly in the form of frequency-toggling antennas that allow the field of view 7 to be toggled. When operated appropriately, it is possible to achieve a situation whereby the antenna patterns of such radar antennas focus over the polar angle range 13 in a relatively narrow manner, whereas they are fanned out comparatively widely over the azimuthal angle range 14.

By selecting the transmission frequency of the transmit antennas TX, the field of view 7 is able to be aligned over the polar angle range 13, wherein the field of view 7, in the case of suitable frequencies, is able to be aligned in a polar angle range 13 of virtually zero degrees up to greater, double-digit polar angles.

Using the four transmit antennas TX that are shown and suitable operating frequencies, the front half-space, that is to say the half-space viewed towards the missile head 4, apart from a spatial cone that is comparatively small in comparison with the overall half-space and concentric to the longitudinal axis L of the missile 1 and extending forwards from the missile head 4, is able to be illuminated well by the field of view 7 of the side-looking sensor 2.

Using the receive antennas RX, which are arranged on opposing sides of the missile body and which are each aligned in the direction of a high-performance maneuvering plane, it is possible to receive and detect reflected radar signals from two opposing space segments.

As is apparent from the circuit according to FIG. 10, a corresponding side-looking sensor 2 may comprise a transmission channel 23 (symbolized schematically by a dashed rectangle) that is connected to one of the four transmit antennas TX 1 to TX 4 via a switching network 24. The circuit furthermore contains a reception channel 25 (again symbolized schematically by a dashed rectangle) by way of which the receive antenna pairs RX1, RX3 or RX2, RX4 are each connected via a switching network.

To record a target object 10, that is to say to detect and locate a target object 10, a corresponding missile controller, as already described further above, uses prior knowledge in the form of target object data, which is used for example via data radio as briefing information about the expected location of the target object 10. The missile controller, in particular the circuit, based on the prior knowledge, switches the transmission channels 23 and reception channels 25 to the transmit antennas TX and receive antennas RX, such that the resulting field of view 7 points in the direction of the expected location.

The circuit according to FIG. 10 furthermore contains an evaluation unit 26 (symbolized schematically by a dashed rectangle) for evaluating the signals from the receive antennas RX, in particular for determining data regarding the target object 10, in particular from signals from the receive antennas RX.

In one exemplary application case, for a target object 10 that would be expected in FIG. 9 at the top left in the space segment between transmit antenna TX1 and the receive antenna pair RX1 and RX3, the respective transmission channels 23 and reception channels 25 may be switched accordingly to these antennas TX1 and RX1, RX3.

If on the other hand it becomes apparent from the data regarding the target object 10 that the target object 10 is at a location in a space segment that is not able to be covered, for example in the azimuthal angle direction, by antenna pairs, for example in a space segment that is located above the transmit antennas TX1 and TX2 or below the transmit antennas TX3 and TX4, the missile controller changes the roll status, the pitch status and/or the yaw status of the missile 1 such that the target object 10 moves into a field of view 7 of one of the antenna pairs and is able to be detected for example by one of the receive antenna pairs RX1, RX3, or RX2 and RX4.

As soon as the side-looking sensor 2 has detected the target object 10, the orientation of the missile 1, in particular the roll status, that is to say the roll angle 15, the pitch status and/or the yaw status, is regulated such that the target object 10 remains roughly in the middle in the field of view 7 and thus in the advantageous detection range or the high-performance maneuvering plane.

Gaps in the spatial coverage above the polar angle theta 11 as a result of limited directability of the antenna patterns above the polar angle theta 11 may for example be avoided by selecting a suitable approach path or an advantageous flight path 16 to the target object 10. By way of example, the flight path 16 may be selected or determined such that, along the flight path 16, taking into account the respective position of the target object 10, this results in a suitable polar angle theta 11 for the direct line of sight 19 from the missile 1 onto the target object 10.

What is known as "trajectory shaping guidance", as already mentioned, may be used for guidance in the approach phase 17, in the case of which the meeting angle 20 between the target object 10 and missile 1 is optimized on the basis of the speeds of the missile 1 and target object 10 so as to give an expedient polar angle theta 11 of the line of sight 19 for the transition to the interception phase 18.

Using the missile controller proposed herein and the method proposed herein, it is possible, to detect moving target objects 10 in a spatial cone, concentric to the longitudinal axis L of the missile 1, in the front half-space of the missile 1, to use a target-seeking sensor deployed laterally from the missile 1, that is to say the side-looking sensor 2 proposed herein. The side-looking sensor 2 is in each case only able to readily detect a limited space segment not concentric to the missile axis L. Using the guidance proposed herein based on prior knowledge, it is however possible to at least largely compensate the inadequacies with regard to the restricted field of view 7. The invention proposed herein furthermore allows the installation space, typically required up until now for a head-side target-seeking sensor having a field of view concentric to the longitudinal axis L of the missile 1, in the missile head 4 or in the missile nose to be kept free for other functions, for example for one or more further sensors, a directed effector system or a heat shield. The underlying invention furthermore makes it possible to implement a multimode guidance part 5, for example having a combination of radar and infrared seekers, without a common aperture (for example in the missile tip) being necessary for this purpose for the different sensors. By way of example, an infrared seeker may be provided in the missile tip independently of a side-looking sensor 2 mounted on the circumference of the missile fuselage.

REFERENCE SIGNS

1 Missile
2 Side-looking sensor
3 Drive
4 Missile body
5 Guidance part
6 Warhead
7 Field of view
8 Middle axis polar angle
10 Target object 11 Polar angle theta
12 Azimuthal angle phi
13 Polar angle range
14 Azimuthal angle range
15 Roll angle
16 Flight path
17 Approach phase
18 Interception phase
19 Line of sight
20 Meeting angle
21 Radar antenna
22 GNSS sensor
23 Transmission channel
24 Switching network
25 Reception channel
26 Evaluation unit
AE Drive-side end
D Distance
F Error
KE Head-side end
L Longitudinal axis
M Middle axis
P Polar axis
Q Transverse acceleration capability
QM Maximum transverse acceleration capability
TX Transmit antenna
RX Receive antenna

The invention claimed is:

1. A missile controller for guiding a missile along a flight path to a target object, the missile controller comprising:
at least one side-looking sensor, configured to record surroundings data, and having a field of view aligned transverse to a longitudinal axis of the missile; and
a controller receiving target object data regarding the target object, the target object data containing position data, orientation data and/or speed data of the target object, said controller configured to set an orientation of the missile during a guidance at least partly based on the target object data received such that the target object is located in the field of view of said at least one side-looking sensor at least in sections of a final guidance phase.

2. The missile controller according to claim 1, wherein said controller is configured, based on the target object data received, to set the orientation of the missile by actively controlling a pitch, yaw and/or roll angle of the missile such that the target object is located, at least in sections of the guidance, within an azimuthal angle range covered by the field of view with respect to a polar axis defined by the longitudinal axis.

3. The missile controller according to claim 1, wherein said controller is configured, based on the target object data, to set the flight path and/or the orientation of the missile such that the target object is located, at least in sections of the guidance, within a polar angle range covered by the field of view with respect to a polar axis defined by the longitudinal axis.

4. The missile controller according to claim 1, wherein said at least one side-looking sensor is configured such that a directional characteristic of said at least one side-looking sensor is able to be adjusted by the missile controller, and wherein the missile controller is configured to adapt a directional characteristic such that the target object is located within the field of view at least in sections along the flight path.

5. The missile controller according to claim 1, wherein said controller is configured to detect the target object located in the field of view and to determine its position, an orientation and/or a speed based on sensor data from said at least one side-looking sensor, and wherein said controller is configured, based on the position, the orientation and/or the speed of the target object, to determine the flight path for adaptively actively, predictively guiding the missile to a provisional meeting location with the target object.

6. The missile controller according to claim 5, wherein said controller is configured to perform at least one of the following steps in a context of the adaptively active, predictive guidance:
predictively determining the provisional meeting location of the missile with the target object and determining a meeting angle such that the field of view contains a direct line of sight onto the target object; and
predictively determining the flight path and/or the orientation of the missile such that the target object is at a predefined distance from field of view edges of the field of view in an azimuthal and/or polar angle direction with respect to the longitudinal axis of the missile as a polar axis.

7. The missile controller according to claim 1, further comprising at least one target-seeking sensor having a field of view concentric to the longitudinal axis of the missile, wherein the missile controller is configured to furthermore use data recorded by said target-seeking sensor to guide the missile.

8. The missile controller according to claim 1, wherein said at least one side-looking sensor contains at least one optical sensor, at least one infrared sensor and/or at least one radar sensor, and wherein the missile controller is configured to determine the position, the orientation and/or the speed of the target object detected from sensor data from said at least one optical sensor, said at least one infrared sensor and/or said at least one radar sensor.

9. The missile controller according to claim 1, wherein the missile controller is furthermore configured to set an azimuthal angle range, defined with respect to the longitudinal axis of the missile as polar axis, of the field of view and a polar angle range, defined with respect to the longitudinal axis of the missile as the polar axis, of the field of view and/or to control the flight path and the orientation of the missile such that at least one of the following conditions is met:
the azimuthal angle range and/or the polar angle range are/is set to be greater a greater an error in a determination of the position, the orientation and/or the speed of the target object;
the azimuthal angle range and/or the polar angle range are/is set at least in a final guidance phase such that they/it are/is greater than the error in a determination of the position, the orientation and/or the speed of the target object;
the azimuthal angle range and/or the polar angle range are/is set greater a greater the speed of the target object; and
the polar angle of a middle axis of the field of view is set on a basis of a determined speed of the target object, wherein the polar angle of the middle axis is set smaller a smaller the speed of the target object.

10. A missile, comprising:
a missile controller for guiding the missile along a flight path to a target object, the missile controller containing at least one side-looking sensor, configured to record surroundings data, having a field of view aligned transverse to a longitudinal axis of the missile, and a controller for receiving target object data regarding the target object, the target object data containing position data, orientation data and/or speed data of the target object, said controller configured to set an orientation of the missile during a guidance at least partly based on the target object data received such that the target object is located in the field of view of said at least one side-looking sensor at least in sections of a final guidance phase.

11. The missile according to claim 10, wherein a middle axis of the field of view with respect to the longitudinal axis of the missile has a radial component and an axial component, wherein said at least one side-looking sensor is arranged with respect to a missile body such that a radial component is aligned substantially parallel to a maneuvering plane of the missile in which the missile has a maximum transverse acceleration capability, and wherein an axial component is aligned parallel to the longitudinal axis.

12. A method for guiding a missile along a flight path to a stationary or moving target object, the missile having a missile controller and a side-looking sensor, which comprises the steps of:
receiving data regarding a position, orientation and/or speed of the target object;
aligning a field of view of the side-looking sensor onto the target object by aligning the side-looking sensor by controlling a directional characteristic of the side-looking sensor, by aligning the missile and/or by setting the flight path of the missile based on received data such that the target object, in a first flight phase, moves into the field of view of the side-looking sensor; and
during a second flight phase following the first flight phase, aligning the field of view onto the target object by controlling the directional characteristic of the side-looking sensor, an orientation and/or the flight path of the missile based on sensor data from the side-looking sensor such that the target object is located in the field of view.

13. The method according to claim 12, wherein, in order to align the field of view onto the target object, a roll, pitch and/or yaw angle of the missile is/are adaptively actively set based on the received data and the sensor data from the side-looking sensor.

14. The method according to claim 12, wherein the field of view is aligned such that the target object is located, at least in sections in flight phases, within an azimuthal angle range and polar angle range covered by the field of view with respect to a polar axis defined by the longitudinal axis of the missile and is at a predefined distance from field of view edges, located in an azimuthal angle and polar angle direction, that is greater than an error in a target object recognition.

15. The method according to claim 12, which further comprises adaptively actively guiding the missile, based on the position, the orientation and/or the speed of the target object as determined from the sensor data from the side-looking sensor, wherein the adaptively active guiding step includes at least one of the following sub-steps:
determining a meeting location of the missile with the target object and setting a flight angle of the missile in relation to the target object such that the field of view of the side-looking sensor contains a direct line of sight onto the target object;
determining the flight path, the orientation of the missile and/or the flight angle in relation to the target object such that the target object is at a predefined distance from a field of view edge of the field of view in an azimuthal and/or polar angle direction; and
recording sensor data by way of a target-seeking sensor having a field of view aligned concentrically to the longitudinal axis of the missile, and determining the flight path, the orientation and/or the flight angle of the missile furthermore based at least partly on the sensor data from a target-seeking sensor.

16. The method according to claim 12, wherein the position, the orientation and/or the speed of the target object is/are determined at least based on the sensor data from the side-looking sensor, and wherein at least one of the following steps is performed by the missile controller of the missile based on the position, the orientation and/or the speed of the target object:
setting or controlling the orientation and/or the flight path of the missile based on the position, the orientation and/or the speed of the target object;
setting a greater azimuthal angle range for the side-looking sensor a greater an error in a determination of the position, the orientation and/or the speed of the target object;
setting the azimuthal angle range of the side-looking sensor such that it is greater, at least in a final guidance phase, than the error in the determination of the position, the orientation and/or the speed of the target object;
setting the azimuthal angle range and/or a polar angle range of the side-looking sensor on a basis of the speed of the target object; and
setting a polar angle of a middle axis of the field of view on a basis of the speed of the target object, wherein the polar angle of the middle axis is set smaller a smaller the speed of the target object.

17. The method according to claim 12, wherein the step of aligning the field of view further comprises setting a settably configured azimuthal angle range, a settably configured polar angle range and/or aligning an alignably configured middle axis of the field of view, wherein the setting and/or alignment is performed based at least on the sensor data from the side-looking sensor, such that the target object is located within the field of view at least in sections along the flight path.

* * * * *